United States Patent [19]

Penfold et al.

[11] Patent Number: 4,459,798
[45] Date of Patent: Jul. 17, 1984

[54] BALER WITH A CONTROLLED RATE PRESERVATIVE APPLICATOR

[75] Inventors: Garn F. Penfold, East Moline, Ill.; David L. Rabe, Ottumwa, Iowa

[73] Assignee: Deere & Company, Moline, Ill.

[21] Appl. No.: 397,304

[22] Filed: Jul. 12, 1982

[51] Int. Cl.³ ............................................. A01D 39/00
[52] U.S. Cl. ....................................... 56/341; 56/16.4; 100/45
[58] Field of Search ................... 56/341, 16.4; 100/45, 100/73, 74, 75, 98 A, 100

[56] References Cited

U.S. PATENT DOCUMENTS

| | | | |
|---|---|---|---|
| 2,503,416 | 3/1945 | Russell | 56/1 |
| 3,996,848 | 8/1975 | Molitorisz | 100/73 |
| 4,185,549 | 1/1980 | Roepnack | 100/45 |
| 4,228,637 | 10/1980 | Richey | 56/341 |
| 4,228,638 | 10/1980 | Rabe | 56/341 |
| 4,352,267 | 10/1982 | Mellinger | 56/341 |

FOREIGN PATENT DOCUMENTS

1281086 7/1972 United Kingdom ................. 100/45

Primary Examiner—Jay N. Eskovitz

[57] ABSTRACT

A rectangular baler has a preservative applicator for applying a fluid preservation to crop material as it is being baled as a function of the baling rate. The application rate is determined by a control circuit which repetitively measures the displacement of a charge of crop material through the baling for each cycle of the plunger and which repetitively opens solenoid controlled valves regulating a pressurized source of fluid preservative for a length of time proportionate to the magnitude of the displacement signal for one plunger cycle.

10 Claims, 9 Drawing Figures

BALER WITH A CONTROLLED RATE PRESERVATIVE APPLICATOR

CROSS-REFERENCE TO RELATED APPLICATION

Application Ser. No. 397,303 filed simultaneously herewith in the name of Hudson et al, entitled BALER HAVING PRESERVATIVE APPLICATOR WITH IMPROVED NOZZLE and assigned to the assignee of the invention herein is directed to a baler having a preservative applicator with an improved nozzle for application of volatile fluids. The nozzle maintains the fluid under high pressure and aids in dispersing the fluid with a high velocity. The invention disclosed and claims in application Ser. No. 397,303 is disclosed herein in Section II for the purpose of completeness of the description of the operative environment of the invention claimed herein and thus forms no part of the invention claimed herein.

BACKGROUND OF THE INVENTION

This invention relates to machines for forming bales (particularly the type having a rectangular cross section) and particularly to an improved means for applying a crop treating fluid such as a liquid ammonia preservative to the crop material as the bale is being formed. The invention herein has particular utility for the application of preservatives which have a high volatility (e.g., ammonia).

The potential benefits of applying preservatives to hay either during a baling process or as a finished bale are well known and include (a) permitting the hay to be baled and stored at higher moisture contents without spoilage, thus reducing field losses (especially losses of leaves in some crops) and making the hay harvesting operation less dependent on favorable weather conditions; (b) improved palatability and digestability; and (c) higher nutrient content. The relative of importance of these benefits vary with the crop being treated and preservative used.

Some of the problems encountered in the application of an ammonia preservative to hay during baling are (a) loss of the ammonia as a vapor; (b) non-uniform distribution throughout the hay; and (c) insufficient retention of the ammonia in the hay to kill the mold organisms.

As disclosed in U.S. Pat. No. 4,185,549, it is known to provide a rectangular baler with a plurality of nozzles for injecting the preservative into each charge of crop material as it is compressed in the baler forming chamber into a bale by the plunger of the baler. The nozzles are mounted in the face of the plunger and are opened for preservative injection only during the compression portion of the plunger cycle. While such a baler is reasonably effective in distributing the hay preservative and reducing the loss of the preservative due to vaporization, the applicator system is not responsive to varying crop and field conditions so as to optimize the application of preservative application for the baling rate. The baling rate may be defined as the quantity of hay (in weight) per unit time which is gathered from the ground, conveyed into the bale forming chamber and formed into a bale. The bale rate varies for different crops, crop conditions and field conditions.

As disclosed in U.S. Pat. No. 4,228,639, it is also known to provide a large round baler with an applicator system with a series of fluid dispensing nozzles spaced laterally across the baler to apply the preservative to the mat of incoming crop material just prior to being rolled onto the bale during formation. The incoming crop mat may vary in width and in lateral disposition relative to the baler conveyor system. Sensors are spaced across the baler to detect the presence or absence of incoming crop material and to control fluid valves in the nozzle lines to apply the preservative on the adjacent portions of the bale where crop material is being added. While this system is responsive to the variation in width and in lateral disposition of the incoming crop mat, it is not responsive directly to the baling rate. Furthermore, the disclosed system has no applicability to a rectangular baler.

SUMMARY OF THE INVENTION

Accordingly, it is an object of this invention to provide a baler with the fluid dispensing applicator which is responsive to the baling rate to optimize instantaneously the rate of application, to provide more uniform distribution of the fluid throughout the bale and to reduce the loss of the fluid due to vaporization.

These and other objects of the invention which will be apparent from the consideration of the following detailed description are accomplished by a baler having a bale forming chamber, a pickup for gathering crop material from the ground and conveying crop material into the chamber and applicator means for applying a crop treating fluid to the material as the material is formed into a bale. In accordance with the improvement of this invention, control means controls the rate of application of fluid from the applicator means as a function of the baling rate. As may be appreciated such a control means makes it possible to maintain an optimum level of application of crop treating fluid to the crop without concern for variations in the baling rate. Variations in the baling rate are inherent and are caused for example by variations in the driving speed, field conditions and crop conditions.

In accordance with the preferred embodiment, the invention is embodied in a small rectangular baler. In a baler of this type, the bale forming chamber includes a duct through which crop material is progressively moved and compacted by a cyclically operable plunger. The control means is preferably comprised as follows. A displacement sensor measures the rate of movement of the crop material through the duct to measure the baling rate for one cycle of the plunger. The displacement sensor generates a displacement signal representative of the displacement of crop material through the duct for the one plunger cycle. The displacement signal is fed to and stored in a displacement counter. Responsive to a timing signal, the displacement signal is transmitted to and stored in a down counter and actuates a switch means to energize the applicator. A clock reads out the displacement signal in the down counter and deactuates the switch means after a period of time proportional to the magnitude of the displacement signal. The switch means includes an amplifier which is actuated to energize and de-energize the applicator responsive to the clock means. The rate of application of fluid for any given baling rate is controllable by a fluid rate control means. The fluid control means sets the clock means to adjust length of time the switch means is actuated for any given displacement signal.

In accordance with the preferred embodiment of the control means, the rate of application of the crop treating fluid is simply and efficiently adjusted responsive to a variable baling rate without the need for operator supervision or intervention.

DESCRIPTION OF THE PREFERRED EMBODIMENT

I. General

Figure 1:
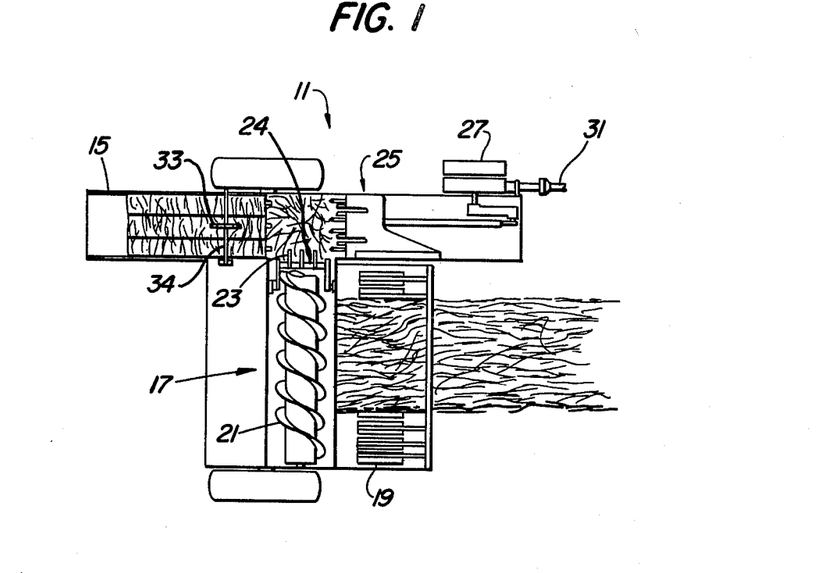
FIG. 1 is a schematic plan view of a baler illustrative of the type in which a fluid applicator system in accordance with this invention may be embodied.
Figure 6:
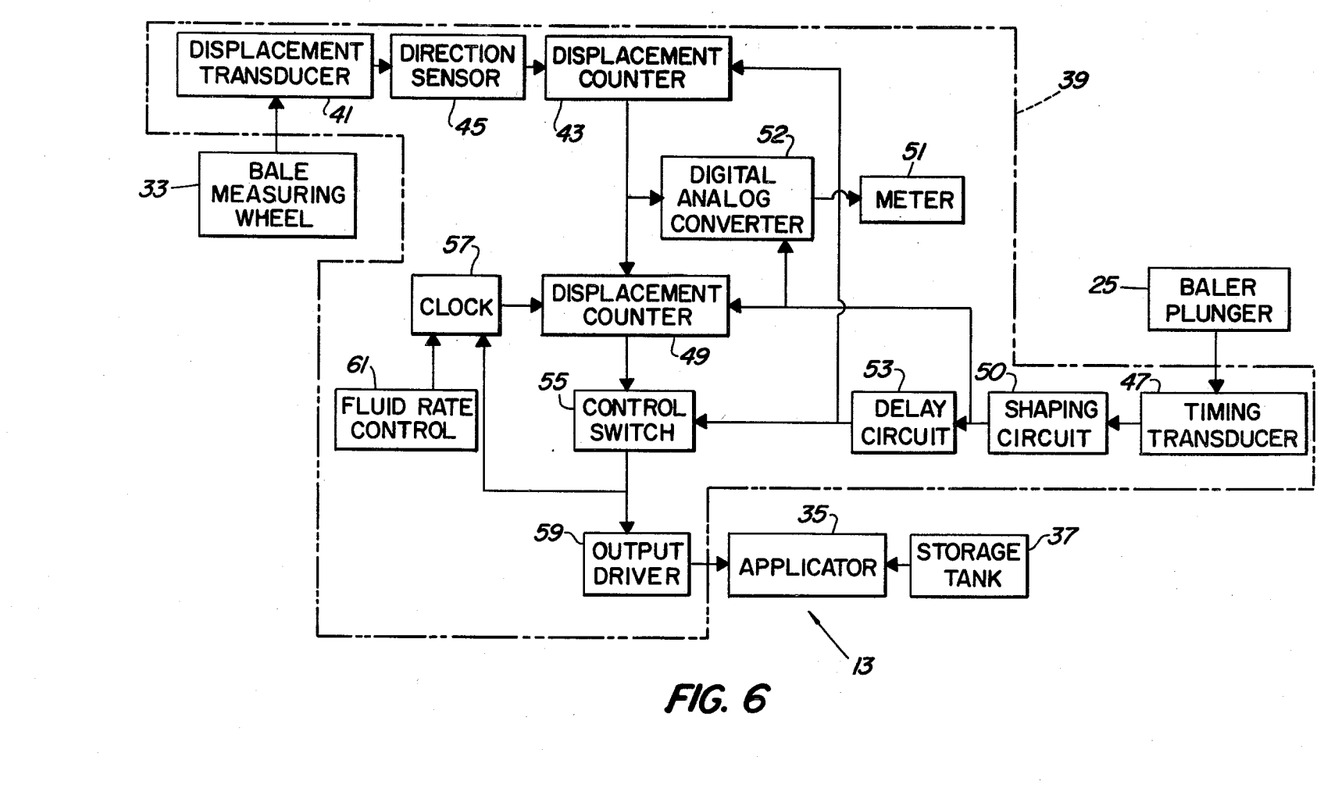
FIG. 6 is a schematic block diagram of the fluid applicator system of the invention herein.

Reference is now made to FIG. 1 which is illustrative of the preferred type of baler 11 in which a fluid applicator system 13 (shown in FIG. 6) in accordance with the features of this invention may be embodied. Baler 11 is conventional and may be identical to Model 336 manufactured by Deere & Company, Moline, Ill. except for the incorporation of system 13. Baler 11 includes a duct shaped bale forming chamber 15, a pickup and conveyor mechanism 17 for gathering crop material from the ground and conveying the crop material into chamber 15. Pickup and conveyor mechanism 17 includes a rotary pickup 19 for gathering crop material from the ground, an auger 21 for receiving crop material from pickup 19 and a plurality of feeder teeth 23 for conveying crop material into bale forming chamber 15 through chamber opening 24. Baler 11 further includes a cyclically operable plunger 25 for compressing and moving crop material through chamber 15. Plunger 25 is driven via a flywheel 27 and a crank 29 interconnected between flywheel 27 and plunger 25. Flywheel 27 is driven by interconnection to a PTO shaft 31 connected to a tractor for pulling baler 11 through a field during a baling operation. As plunger 25 moves into chamber 15, plunger 25 compresses a new charge of hay which has just been inserted into chamber 15 by feeder teeth 23. The process of feeding hay into bale chamber 15 and compressing it with plunger 25 is repeated until a bale is formed. A bale measuring wheel 33 is rotatably mounted on the top of chamber 15 and rotates as a bale progresses through chamber 15. When wheel 33 has completed a preselected cycle, a time mechanism (not shown) is tripped to actuate the mechanism (not shown) for tieing the bale. Bale length is controlled by adjusting the bale measuring cycle of wheel 33.

II. Plunger and Nozzle Array

Figure 2:
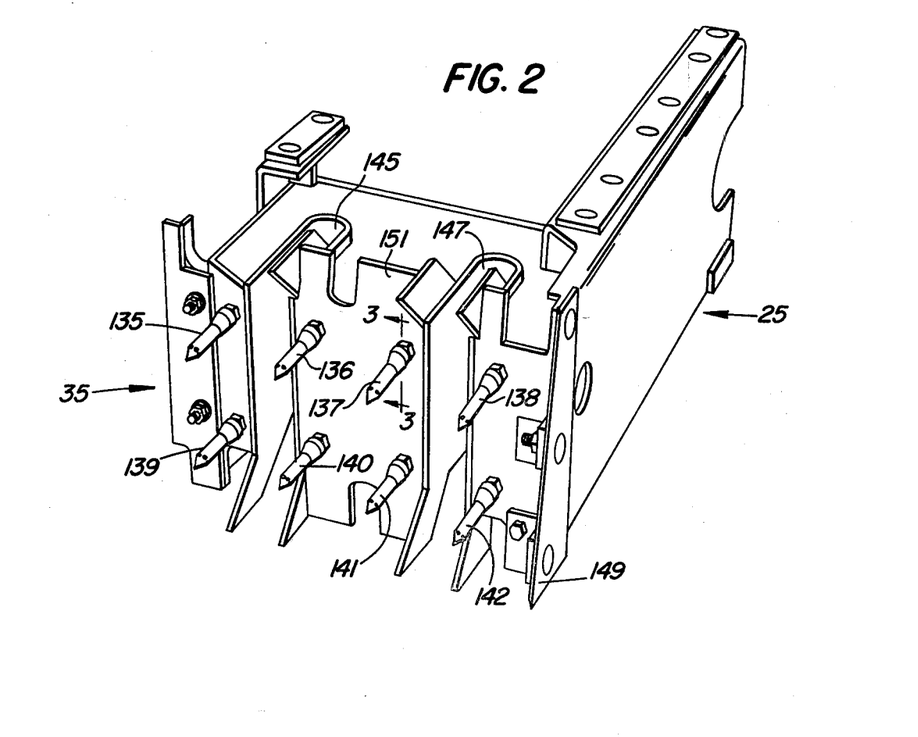
FIG. 2 is a perspective view of the plunger of the baler shown in FIG. 1 and illustrates the nozzles of the fluid applicator system mounted on the face of the plunger.
Figures 3, 4, 5:
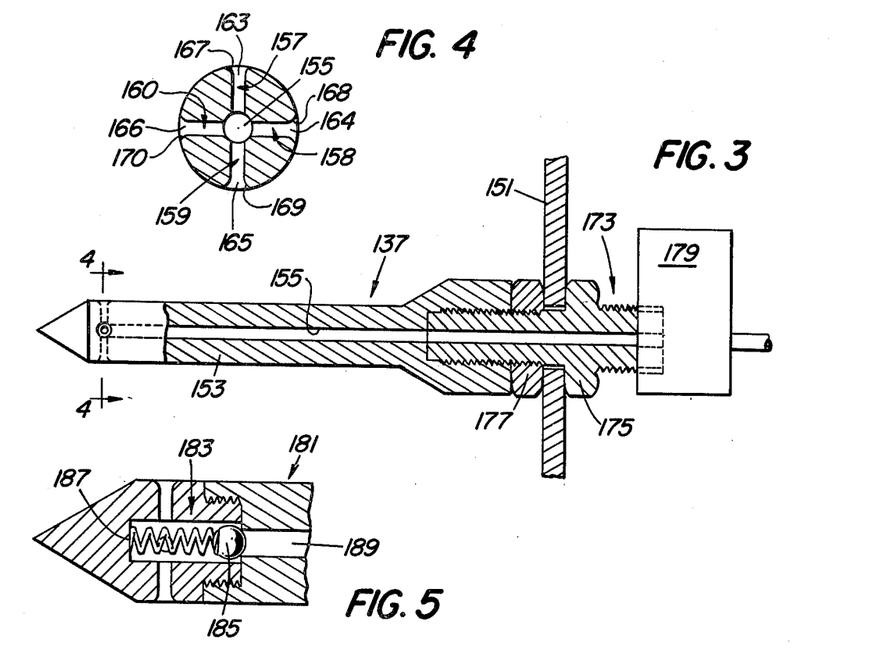
FIG. 3 is a cross-sectional view of a nozzle taken along lines 3—3 of FIG. 2.
FIG. 4 is a cross-sectional view of a nozzle taken along line 4—4 of FIG. 3.
FIG. 5 is a fragmentary longitudinal cross-sectional view of an alternative embodiment of a nozzle for use with the fluid applicator system of this invention.

Reference is now made to FIGS. 2 through 4 which illustrate plunger 25 having mounted thereon an applicator assembly 35 in accordance with the invention claimed in application Ser. No. 397,303 cross-referenced above. Applicator assembly 35 includes an array of nozzles 135–142 for dispersing a volatile crop treating fluid into crop material in chamber 15. Plunger 25 includes a pair of channels, 145, 147 through which tieing needles (not shown) are inserted during the bale tieing operation and a plunger knife 149 which slices off hay not totally within chamber 15 as plunger 25 is moved rearwardly in chamber 15 to compress a new charge of hay. Plunger 25 is conventional except for nozzle array 135–142 mounted on and projecting forwardly (rearwardly in chamber) from a wall 151 forming the hay engaging face of plunger 25.

Nozzles 135–142 are identical and for brevity, only nozzle 137 will be described in detail herein. Nozzle 137 comprises a longitudinal hollow shaft 153 with a passageway 155 formed longitudinally of shaft 153. At one end of shaft 153, a plurality of openings 157–160 are formed and are interconnected with centrally disposed passageway 155. In order to retain a highly volatile crop treating fluid under substantial pressure in nozzle 137, passageway 155 has a cross-sectional area greater than the minimum sum of the cross-sectional areas of openings 157–160. In order to promote the uniform and high velocity dispersion of the crop treating fluid from nozzle 137, each of the openings 157–160 includes a throat 163–166 and a lip 167–170, respectively, such that openings 157–160 have an outwardly increasing cross-sectional area. Throats 163–166 thus form a restriction in the path of flow of the fluid between passageway 155 and lips 167–170, which in accordance with the venturi effect provides the expulsion of the fluid at a high velocity from openings 157–160. In addition, the outwardly diverging lips 163–166 reduces the tendency of the openings to clog with foreign matter.

Each nozzle 135–142 is mounted at spaced locations on and projecting forwardly from the face of plunger 25 by a plurality of nipples 173 (FIG. 3, only one shown). The mounting of nozzles 135–142 on plunger 25 is identical and for simplicity only the mounting of nozzle 137 on nipple 173 will be described. Nipple 173 is inserted through and fixed to wall 151 by a stop 175 formed on nipple 173 and a nut 177. The outer circumference of nipple 173 is threaded, thereby providing simplicity of mounting of nipple 173 to wall 151 and mounting nozzle 137 to nipple 173 which in turn promotes simplicity of repair and maintenance of system 13.

Applicator assembly 35 further includes a conventional solenoid operated valve 179 (only one shown) fixed to the end of nipple 173 opposite to nozzle 137 for controlling the transmission of fluid between a storage tank 37 (FIG. 6) and nozzle 137. The valve 179 is closely spaced to nozzle 137 to promote rapid pressure build up in nozzle 137 so that optimum operating conditions are rapidly achieved. Also, the proximity of valve 179 to nozzle 137 reduces loss of fluid when valve 179 is closed.

Reference is now made to FIG. 5 which illustrates an alternate embodiment of a nozzle 181 for use in applicator assembly 35. Nozzle 181 is identical to nozzle 137 except for pressure responsive check valve 183 mounted in the end of nozzle 181 to restrict loss of crop treating fluid remaining in nozzle 181 following closure of valve 179. Valve 183 is comprised of a ball 185 and spring 187 for causing closure 185 to seal passageway 189 to prevent further escape of fluid following closure of the solenoid controlled valve 179 for controlling fluid through nozzle 181. Spring-controlled valve 183 is preferably set to permit flow at pressure somewhat greater than the vapor pressure of ammonia under field temperatures. Accordingly, storage tank 37 must be maintained at a somewhat higher pressure, or pressurized appropriately by a pump (not shown).

It will be apparent that in accordance with the features of this invention, the nozzle array 135-142 provides for the retention of the volatile crop treating fluid under pressure to enhance the retention of the fluid as a liquid rather than conversion to a vapor by having the minimum cross-sectional area of openings 157-160 smaller than the cross-sectional area of passageway 155. By way of example, in accordance with a embodiment of the invention for the dispersion of ammonia, passageway 155 has a cross-sectional area of 10.24 mm.$^2$ and each of the openings 157-160 has a minimum cross-sectional area of 1.96 mm.$^2$ or a total cross-sectional area of 7.84 mm.$^2$.

Still further by having each of openings 157-160 outwardly diverging, a high velocity is imparted to a crop treating fluid which provides the uniform dispersion of the fluid throughout each hay charge. In accordance with the example discussed above, lips 167-170 may be formed at an outwardly diverging angle of 60 degrees from an axis disposed centrally of each opening.

Still another feature of the invention is that with the use of a rapid closing solenoid actuated valve 179, in combination with check valve 183, loss of the volatile crop treating fluid is minimized.

III. Applicator Control Circuit Means

Reference is now made to FIG. 6 illustrating the fluid applicator system 13 and particularly an applicator control circuit means 39 for automatically controlling the rate of application of crop treating fluid to crop material being baled as a function of the baling rate in accordance with the features of the invention claimed herein. System 13 includes an applicator assembly 35 for applying a crop treating fluid to crop material as it is formed into a bale; a storage tank 37 for supplying crop treating fluid under pressure to applicator assembly 35; and applicator control circuit means 39 for controlling the rate of application of the fluid as a function of the baling rate. The baling rate is defined as the weight of hay per unit time which is gathered from the field, conveyed into the bale forming chamber and formed into a bale. In accordance with the preferred embodiment, the baling rate is determined by measuring the rate of displacement of the hay charge through bale chamber 15, and, more specifically, the displacement of a hay charge through the bale chamber 15 for each cycle of plunger 25. The measurement of the displacement of the hay charge through chamber 15 is made by a displacement transducer 41 which, in the preferred embodiment, may be comprised of a shaft encoder attached to shaft 34 on which wheel 33 is fixed and rotatable therewith as a charge of hay is moved rearwardly through chamber 15. The output of displacement transducer 41 is in digital form and is fed to and stored in a first displacement counter 43. A direction sensor 45 is disposed between transducer 41 and counter 43 to prevent transmission of a signal to displacement counter 43 representative of rotation of wheel 33 in an opposite direction to that indicative of movement of a charge rearwardly through chamber 15. Such movement of wheel 33 occurs following compression of a charge by plunger 25 when plunger 25 is retracted forwardly in chamber 15 to permit insertion of the next charge into chamber 15 by feeder teeth 23, thereby permitting the previously compressed charges to expand forwardly in chamber 15. The displacement signal remains stored in counter 43 until a timing transducer 47 generates a timing signal at a predetermined point in the stroke of plunger 25. In the preferred embodiment, the timing transducer 47 is set to generate a timing signal during the portion of the plunger cycle after the closure of chamber opening 24 by plunger 25 and before the full rearward movement of plunger 25 in chamber 15. The timing signal should be initiated in sufficient time such that application of the fluid is completed while opening 24 is closed by plunger 25 to prevent loss of the fluid preservative. The timing signal is passed through a shaping circuit 50 (a) which filters out spurious signals caused by a mechanical switch used in the timing transducer and riding in contact with a gear (not shown) in the drive train of the baler which makes one revolution (or cycle) for each cycle of plunger 25 and (b) which reduces the pulse width of the timing signal. The reduced width timing signal is transmitted to a second displacement counter 49 which causes the loading of the displacement signal from the first counter 43 to the second counter 49 and a displacement meter 51. The timing signal emanating from shaping circuit 50 is also sent through a delay circuit 53 which sets a control switch 55 and resets displacement counter 43 to a zero value to receive the displacement signal for the next plunger cycle. The setting of control switch 55 actuates a clock 57 to generate a series of timed pulses which incrementally reads out the count on counter 49 until a zero count is reached. Simultaneous with the actuation of clock 57, control switch 55 actuates an output driver 59 which in turn energizes applicator assembly 35 to apply the crop treating fluid to crop material being compressed by plunger 25 in chamber 15 until a zero count is reached in counter 49. Also, when a zero count is reached on counter 49, control switch 55 is reset to an off condition which in turn deactivates output driver 59 (causing applicator assembly 35 to be deactivated) and clock 57. Each pulse from clock 57 represents one unit of displacement from displacement transducer 41.

A fluid rate control 61 regulates the time between pulses from clock 57 which controls the "on" time of applicator assembly 35 and, therefore, the amount of fluid applied to the bale per unit of displacement.

Reference is now made to FIGS. *7a* and *7b* which illustrate in detail a preferred embodiment of applicator control circuit means 39 illustrated in block diagramatic form in FIG. 6 and also to FIG. 8 which is a timing diagram of the wave forms as a function of time at various locations in circuit 39. It will be recognized by those skilled in the art that applicator control circuit means 39 may be effected in a plurality of different ways and FIGS. *7a* and *7b* are intended to be only representative of the preferred manner of effecting applicator control circuit means 39 for controlling the rate of application of a crop treating fluid as a function of the baling rate.

Displacement transducer 41 for measuring the rotation of shaft 34 of wheel 33 may be comprised of a conventional shafting encoder which provides an output pulse for every 6 degrees of rotation of shaft 34.

Shaft encoder 41 is connected to direction sensor 45, which is constituted by a Type D flip-flop 71 (such as is available from Motorola Corp) and a NOR gate 73 for insuring that a digital signal from encoder 41 responsive to reverse rotation of shaft 34 is not transmitted to and stored in displacement counter 43. Shaft encoder 41 includes four terminals 63–66, terminal 63 being connected to a voltage source, terminal 64 being connected into an input terminal 69 of flip-flop circuit 71, a third input 65 being connected to a clock terminal 70 of flip-flop 79, and a fourth terminal 66 being connected to ground. The input terminals of NOR gate 73 are connected to terminals 64, 65 of encoder 41 and the output terminal of NOR gate 73 is connected to a reset terminal 75 of flip-flop 71. When wheel 33 is rotated positively, the logic 1 data input to flip-flop 71 leads the clock input in flip-flop 71 by 90 degrees and flip-flop 71 provides a logic 1 pulse output sychronized with the logic 1 clock input pulse to flip-flop 71 from encoder 41. When wheel 33 is rotated negatively, the logic 1 clock input pulse to flip-flop 71 from encoder 41 leads the logic 1 data input pulse to flip-flop 71 from encoder 41 by 90 degrees and the output from flip-flop 71 is always logic 0. Thus, negative rotation of wheel 33, when a charge of crop material is permitted to expand when plunger 25 is withdrawn forwardly in chamber 15, is effectively filtered out and does not generate a spurious displacement signal. Displacement counter 43 maybe constituted by a conventional four bit binary counter 43. Binary counter 43 is connected to an output terminal 77 of flip-flop and receives and stores a displacement signal from shaft encoder 41. Binary counter 43 is connected to a conventional down counter which constitutes second displacement counter 49 for receiving and storing the displacement signal from binary counter 43 responsive to a timing signal received from timing transducer 47 which is constituted herein by a timing switch 47 operated (opened) by a cam fixed to a gear (not shown) in the drive train for the baler which has a synchronous cycle with that of plunger 25. The timing signal from timing switch 47 is transmitted to down counter 49 via a shaping circuit 50 which is comprised of a conventional contact bounce eliminator 79 and an RC filter 85, both for filtering out spurious bounces of timing switch 47 and a monostable multivibrator 81 for reducing the width of the timing signal. Multivibrator 81 is connected to a preset enable terminal 83 of down counter 49. The timing pulse 87 (location "A") from the output of integrated circuit 79 provides the input into a monostable multivibrator 81 where timing signal pulse 87 is reduced in width to a pulse 89 (location "B") which provides a logic 1 preset enable signal for down counter 49.

Figure 7A:
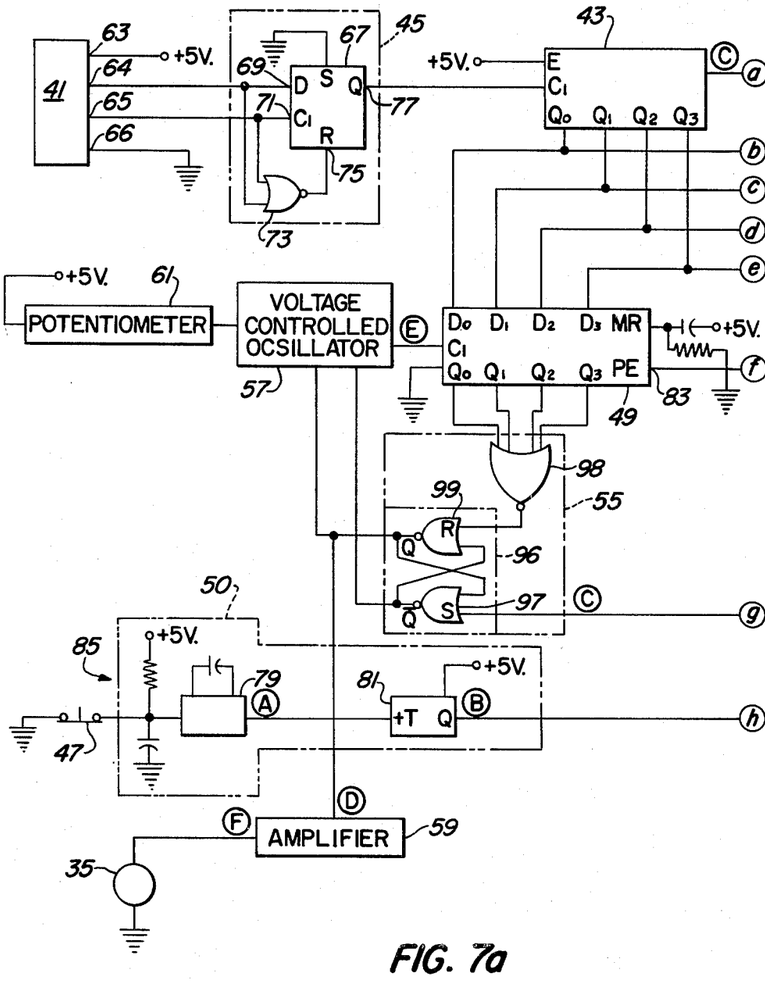
FIGS. 7a and 7b are a detailed schematic of a preferred embodiment of the applicator control circuit shown in FIG. 6. The circuits of FIGS. 7a and 7b are connected at the commonly identified points a–h in each figure.
Figure 7B:
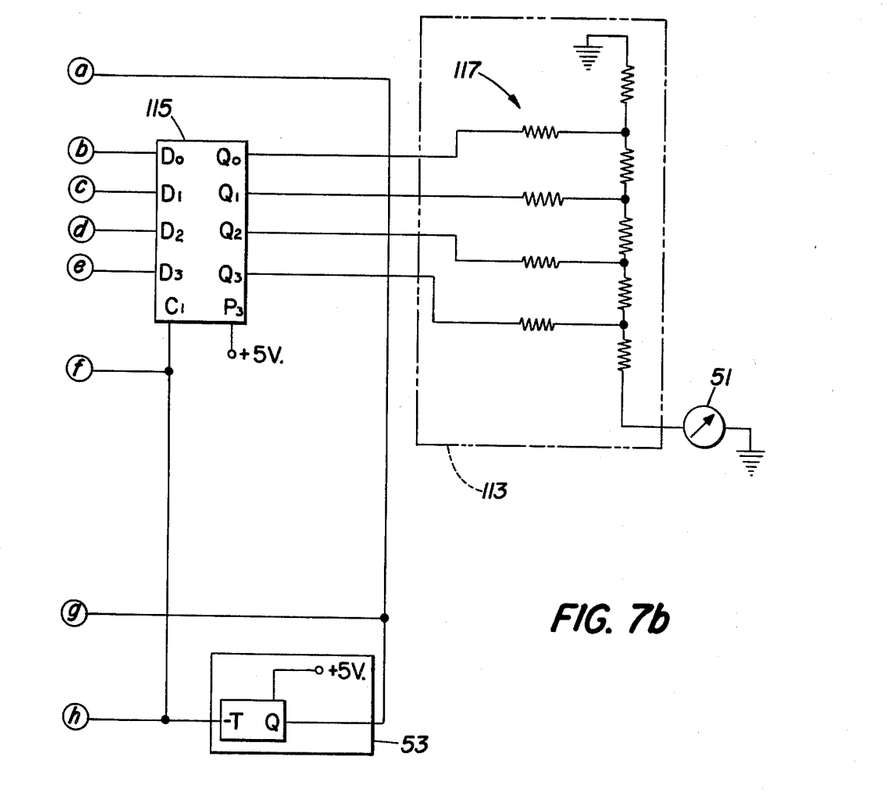
Figure 8:
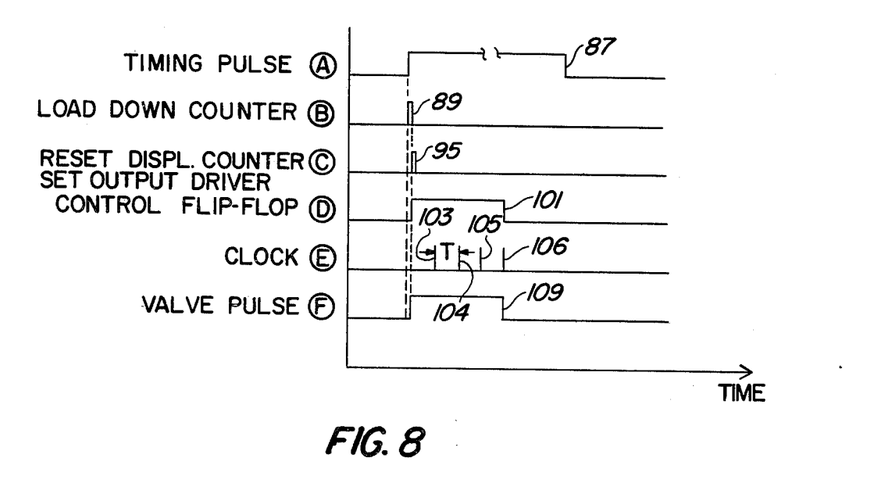
FIG. 8 is a pulse timing diagram for the applicator control circuit shown in FIGS. 7a and 7b.

Multivibrator 81 is also connected to a delay circuit 53 which is comprised of a monostable multivibrator. Responsive to the input of pulse 89 multivibrator 53 generates a delayed pulse 95 (location "C") which is transmitted (a) to a control switch 55 which is constituted by an RS flip-flop 96 and a NOR gate 98 and (b) to displacement counter 43 for resetting counter 43 to record the signal for the next plunger cycle. RS flip-flop 55 is comprised of a pair of NOR gates 97, 99. The delayed logic 1 timing pulse 95 is received by the set terminal of gate 97 and triggers a logic 1 output 101 from the output Q terminal of gate 99. Logic 1 pulse 101 (location "D") is simultaneously transmitted to output driver 59 which is constituted by a conventional transistor amplifier 59 for energizing the solenoid operated valves of applicator assembly 35 and to clock 57 which is constituted by a voltage controlled oscillator 57. Pulse 101 energizes amplifier 59 which in turn energizes and actuates the solenoid operated valves of applicator assembly 35. Voltage controlled oscillator 57 generates a series of logic 1 pulses 103–106 (location "E") separated by a time T which is proportional to the setting on fluid rate control 61 which is constituted by a potentiometer 61. Pulses 103–106 read out the count in down counter 49. The spacing or time between pulses 103–106 thus controls the length of time required to read out the count in down counter 49 and ultimately the length of time applicator assembly 35 is energized for a displacement signal of a specified length. When down counter 49 reaches a zero count, NOR gate 55 resets control flip-flop 55 by transmitting a logic 1 pulse to the reset terminal of gate 99 thereby producing a logic 0 output from terminal Q of NOR gate 99. The resetting of control flip-flop 55 (a) turns amplifier 59 to an off condition which in turn de-energizes the solenoid coils of applicator assembly 35 and (b) de-energizes voltage controlled oscillator 57.

In accordance with another feature of this invention, a gauge 51 provides an analogue read out of the displacement signal for one plunger cycle. Gauge 51 is connected to displacement counter via a conventional digital to analogue converter 113 which is comprised of a conventional digital memory or quad latch 115 and an R-2R ladder 117. The displacement signal from displacement counter 43 is stored in digital memory responsive to transition of the clock input C1 from a high to a low level produced by the trailing edge of pulse 89 from multivibrator 81. The data or displacement signal stored in quad latch 115 is transferred during a high clock level when the polarity terminal P is in the logic 1 state which is always the case with a D.C. voltage constantly applied to the polarity terminal P. Data transfer from one cycle of plunger 25 thus occurs during the next cycle of plunger 25 by the input of the next clock pulse to quad latch 115 from multivibrator 81. Following data transfer during the high clock level, the next displacement signal from counter 43 is stored in quad latch 115 responsive to transition from the high back to the low clock level input from multivibrator 81.

In operation, system 13 applies a crop treating fluid at a rate which is a function of the baling rate. The baling rate is measured by measuring the displacement of the hay charge in bale chamber 15 for each stroke or cycle of plunger 25. The crop treating fluid is applied in an amount directly proportional to the displacement of the hay charge through chamber 15. The hay charge displacement is measured by shaft encoder 41 which measures the rotation of shaft 34 to which wheel 33 is fixed. The displacement signal is stored in displacement counter 43. The displacement signal from encoder 41 is transmitted to displacement counter 43 via direction sensor 45 which filters out any displacement signal from encoder 41 due to a reverse rotation of shaft 34. Timing switch 47 generates a timing signal during the compression portion of the stroke of plunger 25 which is transmitted to contact bounce eliminator 79 to filter out any spurious vibrations of switch 47. Timing signal 87 actuates monostable multivibrator 81 to form a reduced width pulse 89 which in turn causes transfer of the prior displacement signal stored in quad latch 115 to meter 51 and loads the next displacement signal from displacement counter 43 to down counter 49. The timing signal 89 is a clock pulse for latch 115 to transmit the prior displacement signal through R-2R ladder 117 to meter 51 where the displacement signal is indicated as an analogue of the displacement of a hay charge through chamber 15 for one cycle of plunger 25. Timing signal 89 further is transmitted to a monostable multivibrator 91 which forms a delayed pulse 85 (a) for resetting displacement counter 43 to receive and store the displacement signal for the next cycle of plunger 25, and (b) for causing RS flip-flop 55 to generate a logic 1 output pulse from terminal Q. The logic 1 output from terminal Q of flip-flop 55 activates amplifier 59 and in turn the solenoid coils of the solenoid control valves for applicator assembly 35 and activates voltage controlled oscillator 57. Output pulses from oscillator 57 clocks the programmable down counter 49 until counter 49 reaches a zero count which resets the output Q of flip-flop of 55 to a low or logic 0 level which in turn de-energizes amplifier 55, solenoid control coils of the valves for applicator assembly 35 and oscillator 57. Each pulse from oscillator 57 represents one unit of displacement from shaft encoder 41. The fluid rate control potentiometer 61 regulates the time between pulses 103-106 from oscillator 57 which controls the "on" time to the solenoid control valves of applicator assembly 35 and therefore the amount of fluid applied to the bale per unit of displacement. The setting of potentiometer 61 is based on the moisture content (i.e. the density) of the crop material so that the application rate is optimized. That is, the displacement signal which is, in effect, a measure of volume is converted to a weight by independent determination of the crop moisture content or density and adjustment of control potentiometer 61.

The invention has been explained in connection with a preferred embodiment thereof. It will be recognized that other embodiments and modifications thereof are possible. For example, a positive displacement pump may be substituted for solenoid controlled valves 179 as a means of applying discrete amounts of fluids responsive to a variable baling rate. In this instance, the displacement signal would be used to adjust the quantity of fluid dispensed by the pump. Accordingly, it is intended that all such embodiments and modifications are comprehended by the scope of the appended claims.

I claim:

1. In a baler having:

a bale forming chamber, said chamber including a duct through which said crop is compacted and progressively moved, a pickup for gathering crop material from the ground and conveying said crop material into said chamber;

a cyclically operable plunger for compressing and moving crop material through said chamber; and applicator means for applying a crop treating fluid to said material as said crop material is formed into a bale, the improvement comprising:

control means for controlling the rate of application of said fluid as a function of the baling rate for each cycle of said plunger;

said control means comprises a displacement transducer for measuring the rate of movement of crop material through said duct to measure the baling rate; and a displacement counter for storing a displacement signal representative of the displacement of crop material through said duct for one cycle of said plunger.

2. The improvement of claim 1 wherein said control means further comprises:

a down counter for receiving and storing said displacement signal, a switch means for energizing and de-energizing said applicator means, and clock means for reading out the displacement signal on said down counter and actuating said switch means for a period of time proportional to the magnitude of said displacement signal.

3. The improvement of claim 2 wherein said control means comprises a fluid rate control means for setting said clock means to control the length of time said switch means is actuated for any given displacement signal of a predetermined magnitude thereby controlling the rate of application of said fluid for any given baling rate.

4. The baler of claim 1 or 3 wherein said fluid has a high volatility.

5. In a baler having:

a bale forming chamber, a pickup for gathering crop material from the ground and conveying said crop material into said chamber, a cyclically operable plunger for compressing and moving crop material through said chamber, and applicator means for applying a high volatility, crop treating fluid to said material as said crop material is formed into a bale, the improvement comprising:

control means for automatically, incrementally measuring the quantity of crop material being processes by said baler for each cycle of said plunger and for automatically adjusting the rate of application of said fluid responsive to each incremental measurement.

6. The improvement of claim 5 wherein:

said chamber including a duct through which said crop is compacted and progressively moved; and said control means comprises a displacement transducer for measuring the rate of movement of crop material through said duct to measure the baling rate.

7. The improvement of claim 6 wherein:

said control means comprises a displacement counter for storing a displacement signal representative of the displacement of crop material through said duct for one cycle of said plunger.

8. The improvement of claim 7 wherein said control means further comprises:

a down counter for receiving and storing said displacement signal, a switch means for energizing and de-energizing said applicator means, and clock means for reading out the displacement signal on said down counter and actuating said switch means for a period of time proportional to the magnitude of said displacement signal.

9. The improvement of claim 8 wherein said control means comprises a fluid rate control means for setting said clock means to control the length of time said switch means is actuated for any given displacement signal of a predetermined magnitude thereby controlling the rate of application of said fluid for any given baling rate.

10. In a baler having:

a bale forming chamber, a pickup for gathering crop material from the ground and conveying said crop material into said chamber, a cyclically operable plunger for compressing and moving crop material through said chamber, and applicator means for applying a crop treating fluid to said material as said crop material is formed into a bale, the improvement comprising:

control means for automatically controlling the rate of application of said fluid as a function of the baling rate for each cycle of said plunger.

* * * * *